United States Patent [19]
Duane

[11] Patent Number: 5,161,484
[45] Date of Patent: Nov. 10, 1992

[54] COLLAPSIBLE, PORTABLE PET REST ATTACHABLE TO A BED

[76] Inventor: Julie N. Duane, P.O. Box 20604, Sedowa, Ariz. 86341

[21] Appl. No.: 787,371

[22] Filed: Nov. 4, 1991

[51] Int. Cl.⁵ .............................................. A01K 29/00
[52] U.S. Cl. ...................................... 119/28.5; 5/185; 5/426
[58] Field of Search ........................ 119/28.5, 19, 168; 5/185, 308, 503, 577, 508, 426, 58; 248/311.2, 205.1

[56] References Cited

U.S. PATENT DOCUMENTS

| | | | |
|---|---|---|---|
| 1,066,976 | 7/1913 | Atkinson | 5/426 |
| 1,442,157 | 1/1923 | Korp | 5/185 |
| 3,154,052 | 10/1964 | Sweeney | 119/168 |
| 3,173,398 | 3/1965 | Raymond | 119/28.5 |
| 3,465,930 | 9/1969 | La Croix | 119/28.5 |
| 4,057,031 | 11/1977 | Williams et al. | 119/28.5 |
| 4,198,718 | 4/1980 | Ballard | 119/19 |
| 4,781,147 | 11/1988 | Delino, Jr. | 119/19 |
| 5,007,530 | 4/1991 | Weismantel | 119/168 |

FOREIGN PATENT DOCUMENTS 2599585  12/1987  France ........................ 119/168

*Primary Examiner*—Gene Mancene
*Assistant Examiner*—Todd E. Manahan

[57] ABSTRACT

A collapsible, portable pet rest attachable to a bed has a rigid, flat, horizontal base with fixedly attached vertical rear and side walls. A rigid, flat support panel pivotally attached to the back wall can be positioned horizontally aft of the base. A front wall pivotally attached to the base can be secured into a horizontal position with latches. Legs pivotally attached to the front wall provide frontal support of the pet rest when the front wall is secured horizontally and the support panel is in place between a cushion and an underlying support cushion such as a mattress and box-spring. Adjustable leg extensions permit various elevations from a floor. An optional, movable shelf adds width when attached to the base and extended out horizontally. The pet rest will hang vertically against a bed in a box-like configuration with the support panel in place between the mattress and box-spring. For portability, fastening devices maintain closure of the box-like unit. A handle is attached for manual carrying.

6 Claims, 3 Drawing Sheets

COLLAPSIBLE, PORTABLE PET REST ATTACHABLE TO A BED

FIELD of the INVENTION

This invention relates to a collapsible, portable pet rest that is attachable to a bed. The pet rest provides sleeping space for a domestic animal. In its present form the pet rest is much like a piece of furniture specific to pets.

BACKGROUND ART

To my knowledge, heretofore pet beds have been selfcontained, non-elevated, separate units to be placed directly upon a floor. Many have been made of basket-like materials or cloth-covered foam cushions. Most do not fold into an easily portabled unit.

The Pet Pad in U.S. Pat. No. 3,565,040 to Pohl, Feb. 23, 1971, is portable but appears limited to on the floor placement.

The Holster Holder in U.S. Pat. No. 4,483,501 to Eddy, Nov. 20, 1984, demonstrates the concept of a unit used for holding an item when placed against a suitable support surface, However Eddy limits his invention to the holding of a hand gun.

The collapsible, Portable Pet Rest Attachable to a Bed of the instant invention differs significantly from the prior art in that the Pet Rest provides a support surface off the floor for domesticated animals, it folds and hangs vertically against a bed when not in use, thus freeing floor space, and the Pet Rest closes and fastens into a briefcase-style unit for easy portability. The Pet Rest provides a physically close sleeping space for a pet to pet owner when attached to the owner's bed. The natural tendency of most pets to sleep in the master's bed diminishes as evidenced and observed during my own six months of experimentation.

A general problem among pet owners has been the nightly invasion of personal bed space by the pet or pets. The Pet Rest offers a solution keeping the pet in close proximity yet not in the bed.

SUMMARY

The pet rest of the present invention is collapsible, portable, and it attaches to a bed or other suitable support surface such as a sofa or an upholstered chair with a top cushion. The pet rest is an appropriate resting place for a domestic animal.

The pet rest provides a rigid supportive surface which is off of the floor when it is placed against a bed. A uniquely hinged panel is placed between a box-spring and mattress which, along with the legs, elevates the pet rest. When set up at a bedside, the pet rest provides a physical closeness of pet to pet owner. The pet is less likely to invade the owner's bed space. Adjustable leg extensions make the unit adaptable to beds varying in heights from the floor.

When the pet rest is not in use, it can be folded away beside the bed. In this position the pet rest hangs down vertically to the floor, the panel still placed between the box-spring and mattress. This vertical position frees up floor space beside the bed during non-use times.

The pet rest can be easily carried with its single chest handle when the unit if folded and snapped into its briefcase-style portable unit configuration. This portability makes the pet rest ideal for one who takes his or her pet traveling.

The pet rest will accomodate most sizes of household pets. An optional pull-out shelf is offered for the large pet.

Preferably, the collapsible, portable pet rest of the present invention comprises a rigid flat rectangular base of sufficient size to accomodate a domestic animal at rest, four walls attached to the base presenting a topless box-like unit, a hinged panel that supports the rear of the pet rest when the panel is slipped between a box-spring and mattress of a bed, and legs with extensions that allow the unit to adjust to various heights from a floor. This assembly of rigid wooden parts are put together in such a way as to permit three separate positions: horizontal above a floor beside a bed, vertical to the floor beside a bed, and as a separate briefcase-like portable unit. The three positions are accomplished by means of hinges, latches and snap assemblies.

While my above description contains many specificities, these should not be construed as limitations on the scope of my invention. Other variations for the pet rest might include serving as a sick-bed-side tray. Infants might sleep on the pet rest with the inclusion of a safety harness.

The pet rest proto-type is made of wood, however any rigid material such as plastic or metal could be used in the construction appropriately.

Further objects and advantages of this invention will be apparent from the following detailed description of a presently-preferred embodiment thereof, shown in the accompanying drawings.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DESCRIPTION OF THE PREFERRED EMBODIMENTS

Figure 1:
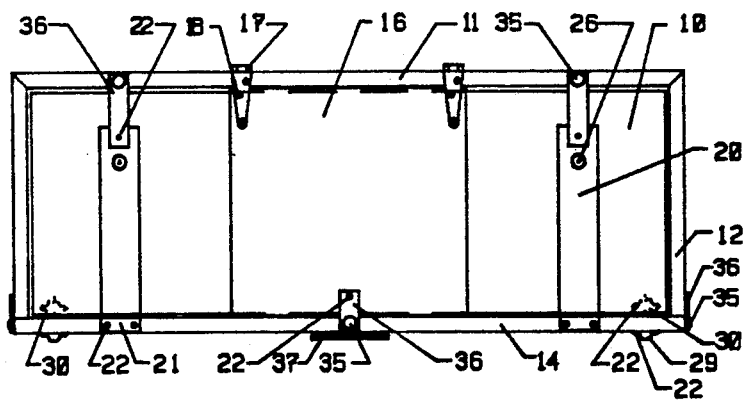
FIG. 1 is a top plan view showing the pet rest in a closed position.
Figure 4:
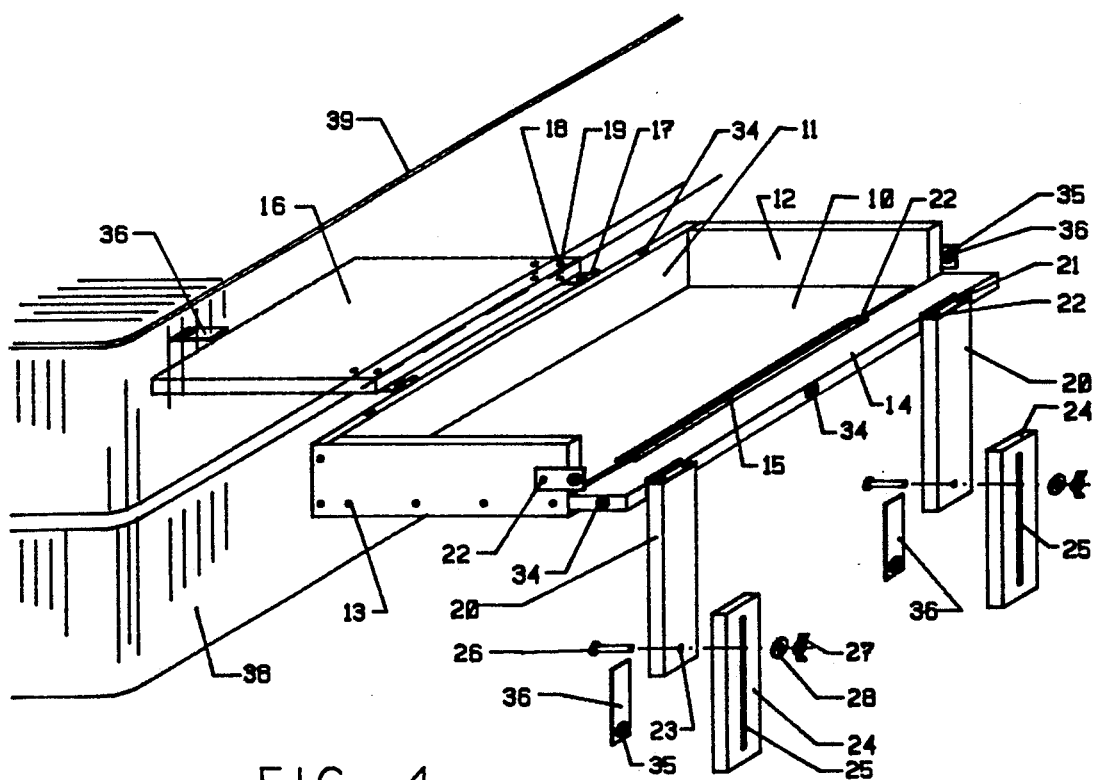
FIG. 4 is a front angle view showing the pet rest in an open position supported against a bed.
Figure 6:
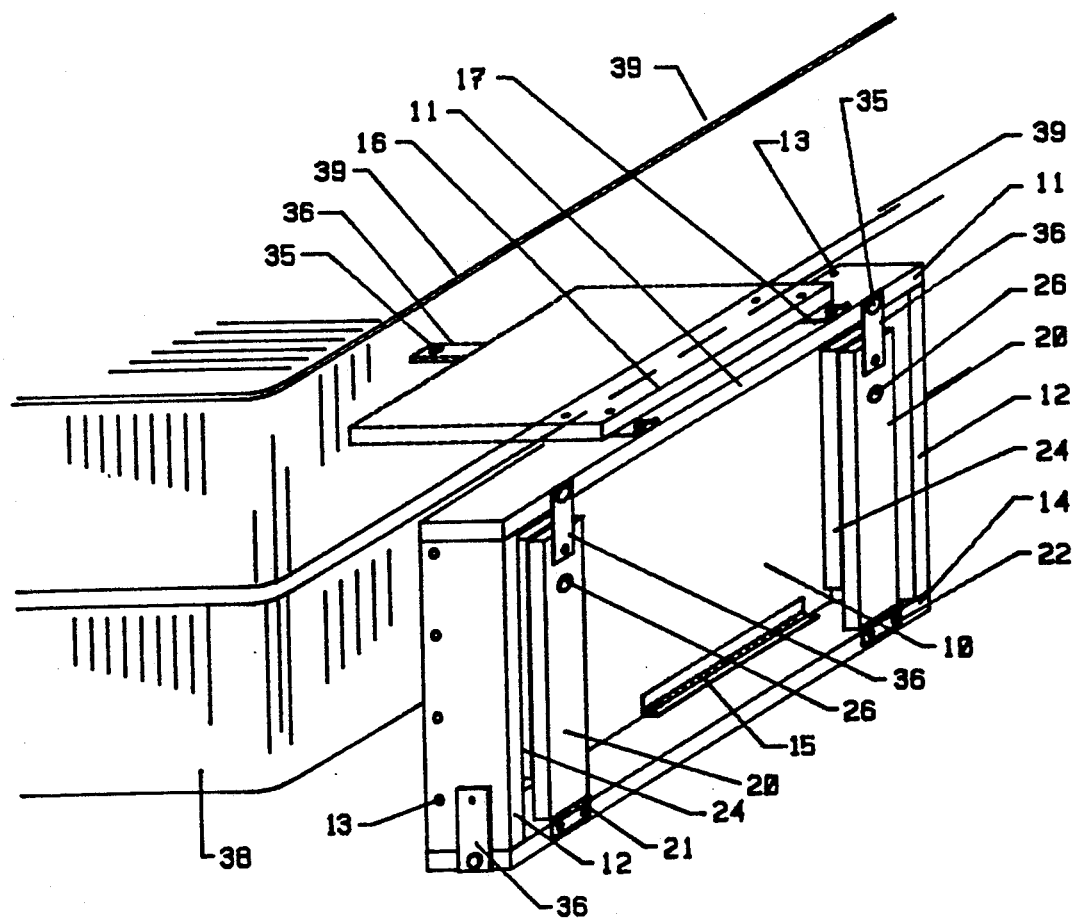
FIG. 6 is a front angle view showing the pet rest in a storage position supported against a bed.

FIG. 1 is a top view of the pet rest in its closed position comprising a rigid flat rectangular base (10), a rigid elongated back wall (11) amd two shorter side walls (12) perpendicularly affixed to the base (10) with nails (13) shown in FIGS. 4 and 6.

Figure 2:
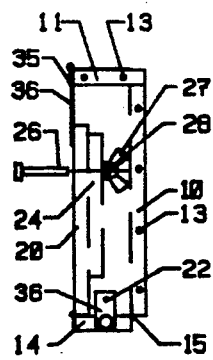
FIG. 2 is a side elevation taken from the right side of FIG. 1.
Figure 3:
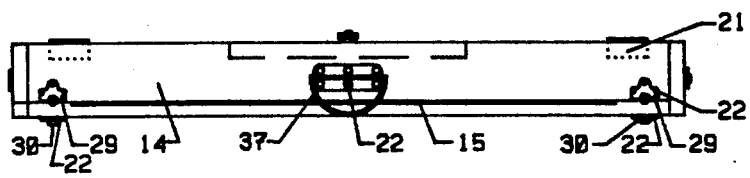
FIG. 3 is a front plan view showing the pet rest in a closed position.

An elongated front wall (14) in FIGS. 2, 3, and 4 is hinged to the front edge of the base (10) with a continuous hinge (15) which permits the front wall (14) to be positioned perpendicularly (FIGS. 1, 2, and 3) or horizontally, (FIG. 4) to the base (10).

A rigid flat square panel (16) in FIGS. 1 and 4 is hinged to the center outside surface near the top of the back wall (11) with strap hinges (17) attached with machine screws (18) and engageable hex nuts (19) as shown in FIG. 4. The strap hinges (17) permit positioning of the panel (16) to be horizontally above the base (10) as shown in FIG. 1, or horizontally aft of the base (10) as shown in FIGS. 4, 5, 6, 7, and 8. The panel (16) is the rear support means of the pet rest when the panel (16) is slipped between a box-spring (38) and Mattress (39) of a bed as shown in FIGS. 4–8.

Figure 8:
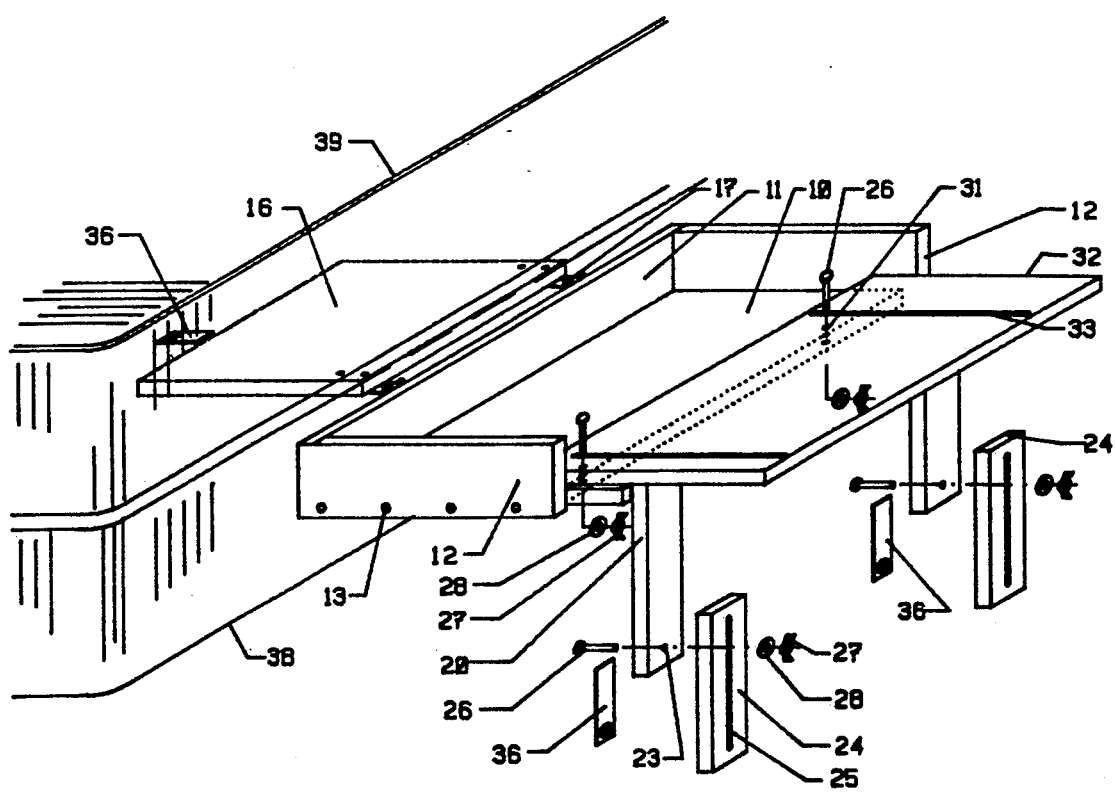
FIG. 8 is a front angle view showing the pet rest with the optional shelf attached in an open position supported against a bed.

Rigid elongated legs (20) are hinged to the top edge of the front wall (14) with utility hinges (21) attached with wood screws (22). The legs are equally spaced inward from left and right ends of the front wall (14) as shown in FIG. 1. The utility hinges (21) permit positioning of the legs (20) to be horizontally above the base (10) as shown in FIG. 1 or to be perpendicular to the base (10) as shown in FIGS. 4 and 8. This perpendicular position of the legs (20) to the base (10) is possible when the front wall (14) is lowered into its position horizontal to the base (10).

FIGS. 4 and 8 also show rigid movable, removable leg extensions (24) positioned parallel to the legs (20). The extensions (24) have routed channels (25) correlating to holes (23) that have been drilled through the legs (20). The extensions (24) can be secured to the legs (20) in various parallel positions with screw threaded bolts (26), washers (28) and engageable wing nuts (27).

FIGS. 1, 2, and 3 illustrate the pet rest as a closed unit with a chest handle (37) attached to the front wall (14) with wood screws (22) for easy portability.

FIGS. 1 and 3 show male catch latch components (29) and female catch latch components (30) which when engaged secure the front wall (14) in a horizontal position to the base (10), the position as shown in FIGS. 4 and 8. The male components (29) are mounted to the outer hinged edge of the front wall (14) with wood screws (22) and the female components (30) are mounted to the front underside of the base (10), also with wood screws (22).

Figure 7:
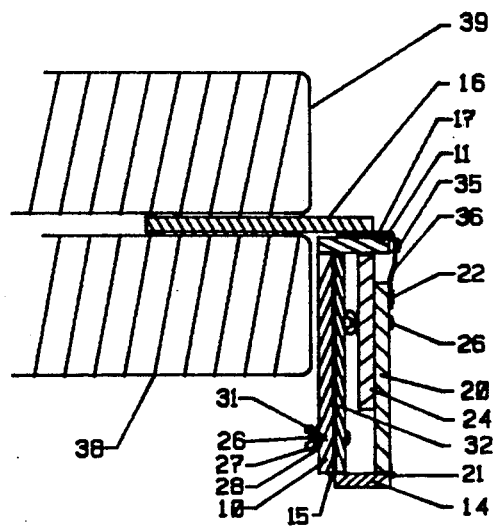
FIG. 7 is a left side elevation taken from FIG. 6 showing the pet rest with the optional shelf attached in a storage position supported against a bed, left side wall omitted.

FIGS. 7 and 8 address the positioning of an optional movable, removable rigid flat rectangulat shelf (32) which is positioned horizontally upon the base (10). The shelf (32) has routed channels (33) equally spaced inward from left and right ends of the shelf (32). These channels correlate to holes (31) which have been drilled through the base (10) near its front edge. The shelf (32) can be secured to the base (10) in various parallel positions with screw threaded bolts (26), washers (28) and engageable wing nuts (27).

FIG. 1 best depicts the closure means with which the various elements of the pet rest are retained in its boxlike closed configutation for easy portability. Female snap components (35) are joined by pressure to one end of a strip of leather (36). The other end of the leather (36) is attached with a wood screw (22) to the side walls (12), (see FIG. 2), to the legs (20) and to the panel (16).

Figure 5:
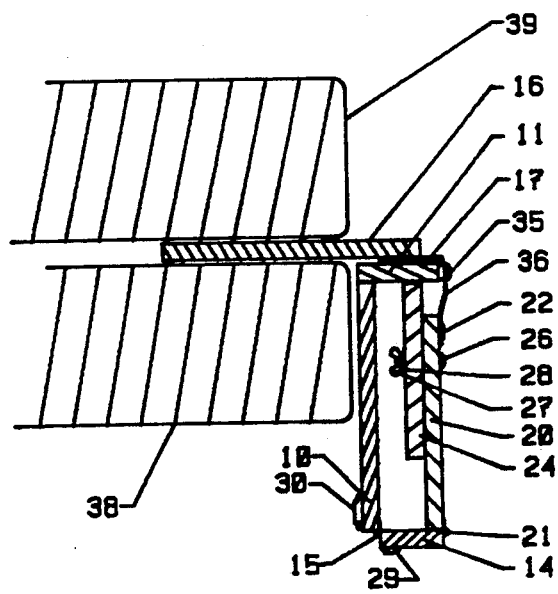
FIG. 5 is a left side elevation taken from FIG. 6 showing the pet rest in a storage position supported against a bed, left side wall omitted.

The figures contained herein illustrate three basic configurations of the collapsible, portable pet rest attachable to a bed of the present invention. FIGS. 1, 2, and 3 depict the pet rest in a closed, box-like position which permits portability using a single chest handle (37). FIGS. 4 and 8 show the pet rest in its open, in-use position being supported against a bed, the panel (16) having been slipped between a box-spring (38) and a mattress (39). FIGS. 5, 6, and 7 illustrate the bedside storage position of the pet rest when it is not in use, still being supported against a bed, the panel (16) slipped between a box-spring (38) and a mattress (39).

The foregoing is considered as illustrative only of the principals of the invention. Further, since modifications and changes may readily occur to those skilled in the art, it is not desired to limit the invention to the exact construction and operation shown and described, and accordingly, all suitable modifications and equivalents may be resorted to, falling within the scope of the claimed invention.

I claim:

1. A collapsible, portable pet rest for a domestic animal comprising:
   a) a rigid, flat, horizontal base of sufficient size to accommodate a domestic animal; said base having a front edge, a rear edge, and side edges;
   b) a plurality of stationary, vertical sidewalls fixedly attached to the rear and side edges of said base and extending upwardly therefrom;
   c) a front wall pivotally attached at a bottom edge thereof to the front edge of said base; said front wall being pivotable between a first vertical position, wherein said front wall extends upwardly from said base, and a second horizontal position, wherein said front wall extends parallel to, and coextensive with, said base; said front wall, sidewalls and base forming an open, topless box when said front wall is in said first vertical position;
   d) a flat, rigid, rear support panel having a front edge and a rear edge; said rear edge of said support panel being pivotally attached to a top edge of the vertical sidewall at the rear edge of said base; said support panel being pivotable to a first position, wherein said support panel is parallel to, and overlying said base; a second position, wherein said support panel is parallel to, and extends outwardly from said base, and a third position, wherein said support panel extends normal to and downwardly from said base; said support panel acting as a partial lid for the topless box when said support panel is in the first position thereof; and
   e) a plurality of rigid, elongate support legs of equal length pivotally attached to a top edge of said front wall; said support legs being pivotable between a first position, wherein said support legs extend rearwardly of said front wall so as to overly said base when said front wall is in its first vertical position, and a second position, wherein said support legs extend forwardly of said front wall so as to extend vertically and downwardly from said front wall when said front wall is in the second horizontal position;

wherein, in use, said support panel is placed in the second position thereof and inserted between a cushion and an underlying cushion support surface; said front wall is placed in its second, horizontal position; and said leg members are placed in the second position thereof such that said support panel and said support legs support the pet rest above the ground.

2. The pet rest according to claim 1 further comprising;
   f) a plurality of rigid, elongate leg extensions of equal length; each of said leg extensions being removably mounted on one of said support legs such that the leg extension extends longitudinally along the support leg; and g) means for adjustably moving each leg extension longitudinally relative to the respective support leg such that the leg extension extends outwardly beyond the support leg.

3. The pet rest according to claim 1 further comprising a plurality of latches, each latch having a first component and a second mating component; said first component of each latch being attached to said front wall and said second component of each latch being attached to an underside of said base; said latches serving to secure said front wall in the second, horizontal position.

4. The pet rest according to claim 1 further comprising;
f) a removable, rigid, flat shelf; and
g) a means for adjustably mounting said shelf on said base such that said shelf is movable from a position completely overlying said base to a position wherein said shelf at least partially extends outwardly beyond the front edge of said base.

5. A collapsible, portable pet rest for a domestic animal comprising:
a) a rigid, flat, horizontal base of sufficient size to accomodate a domestic animal; said base having a front edge, a rear edge, and side edges;
b) a plurality of stationary, vertical sidewalls fixedly attached to the rear and side edges of said base and extending upwardly therefrom;
c) a front wall pivotally attached at a bottom edge thereof to the front edge of said base; said front wall being pivotable between a first, vertical position, wherein said front wall extends upwardly from said base, and a second, horizontal position, wherein said front wall extends parallel to, and coextensive with said base; said front wall, sidewalls and base forming an open, topless box when said front wall is in said first, vertical position;
d) a plurality of latches, each latch having a first component and a second mating component; said first component of each latch being attached to said front wall and said second component of each latch being attached to an underside of said base; said latches serving to secure said front wall in the second, horizontal position;
e) a flat, rigid, rear support panel having a front edge and a rear edge; said rear edge of said support panel being pivotally attached to a top edge of the vertical sidewall at the rear edge of said base; said support panel being pivotal to a first position, wherein said support panel is parallel to, and overlying said base; a second position, wherein said support panel is parallel to, and extends outwardly from said base; and a third position, wherein said support panel extends normal to, and downwardly from said base; said support panel acting as a partial lid for the topless box when said support panel is in the first position thereof;
f) a first fastening device having two releasably engagable parts; one part of said first fastening device being affixed to said support panel and the other part of said first fastening device being affixed to said front wall; said first fastening device serving to secure said support panel in the first position thereof;
g) a plurality of second fastening devices; each of said second fastening devices having two releasably engagable parts; one part of each second fastening device being affixed to said front wall and the other part of each second fastening device being affixed to one of the sidewalls attached to the side edges of said base; said second fastening devices serving to secure said front wall in the first, vertical position thereof;
h) a plurality of rigid elongate support legs of equal length, each support leg being pivotally attached at a proximal end thereof to a top edge of said front wall; said support legs being pivotable between a first position, wherein said support legs extend rearwardly of said front wall so as to overly said base when said front wall is in the first, vertical position, and a second position, wherein said support legs extend forwardly from said front wall when said front wall is in the second, horizontal position;
i) a plurality of third fastening devices, each of said third fastening devices having two releasably engagable parts; one part of each third fastening device being affixed to said support legs and the other part of each third fastening device being affixed to the sidewall at the rear edge of said base; said third fastening devices serving to secure said support legs in the first position overlying said base;
j) a plurality of rigid, elongate leg extensions of equal length; each of said leg extensions being removably mounted on one of said support legs such that the leg extension extends longitudinally along the support leg;
k) means for adjustably moving each leg extension longitudinally relative to the support leg such that the leg extension extends outwardly beyond the support leg;
l) a removable, rigid, flat shelf; and
m) means for adjustably mounting said shelf on said base such that said shelf is movable from a position completely overlying said base to a position wherein said shelf at least partially extends outwardly beyond the front edge of said base;
wherein, in use, said support panel is placed in the second position thereof and inserted between a cushion and an underlying cushion support surface; said front wall is placed in its second, horizontal position; and said leg members are placed in the second position thereof such that said support panel and said support legs and leg extensions support the pet rest above the ground; and
wherein said front wall is placed in the first, vertical position and is secured by said second fastening devices; said leg members are placed in the first position thereof, overlying said base, and are secured by said third fastening devices; and said support panel is placed in the first position thereof, overlying said base and is secured by said first fastening device such that said pet rest is in a closed, box-like configuration for transport and storage.

6. The pet rest according to claim 5 further comprising a handle attached to said front wall for carrying the pet rest when in the closed, box-like configuration.

* * * * *

UNITED STATES PATENT AND TRADEMARK OFFICE
CERTIFICATE OF CORRECTION

PATENT NO. : 5,161,484

DATED : November 10, 1992

INVENTOR(S) : Julie N. Duane

It is certified that error appears in the above-identified patent and that said Letters Patent is hereby corrected as shown below:

On title page, item [76], should read --Julie N. Duane, 20 Cedar Court, Sedona, Arizona 86336.

Signed and Sealed this

Ninth Day of March, 1993

*Attest:*

STEPHEN G. KUNIN

*Attesting Officer*   Acting Commissioner of Patents and Trademarks